United States Patent [19]

Nielsen et al.

[11] 4,362,127

[45] Dec. 7, 1982

[54] MILKING BARN SYSTEM AND APPARATUS

[75] Inventors: Floyd P. Nielsen, Phoenix; Thomas A. Wallender, Chandler, both of Ariz.

[73] Assignee: Nielsen Industries, Inc., Phoenix, Ariz.

[21] Appl. No.: 274,978

[22] Filed: Jun. 18, 1981

[51] Int. Cl.³ ............................................... A01K 1/12
[52] U.S. Cl. .................................... 119/14.03; 119/27
[58] Field of Search ............................. 119/14.03, 27

[56] References Cited

U.S. PATENT DOCUMENTS

| | | |
|---|---|---|
| 1,540,290 | 6/1925 | Selinger et al. |
| 2,198,048 | 4/1940 | Babson et al. ........................ 119/27 |
| 2,969,039 | 1/1969 | Golay .................................. 119/14.03 |
| 3,127,871 | 4/1964 | Jorgensen, Jr. ....................... 119/27 |
| 3,368,529 | 2/1968 | Ferris .................................. 119/51.11 |
| 3,738,320 | 6/1973 | Holm ................................... 119/14.03 |
| 3,810,442 | 5/1974 | Jacobs et al. ........................ 119/14.03 |
| 3,885,528 | 5/1975 | Vandenberg ........................ 119/14.03 |
| 4,194,467 | 3/1980 | Nielsen et al. ..................... 119/14.03 |

*Primary Examiner*—Hugh R. Chamblee
*Attorney, Agent, or Firm*—Charles E. Cates; Victor Myer

[57] ABSTRACT

In a herringbone stall apparatus efficiency of operation is achieved by having the stall, the feeding equipment and individual gates for each stall carried by a single supporting and reciprocatable structure. The gates are split with unequal sections and all gates are opened at one time and closed at one time. Each cow exits through its own gate and all cows exit at the same time.

15 Claims, 9 Drawing Figures

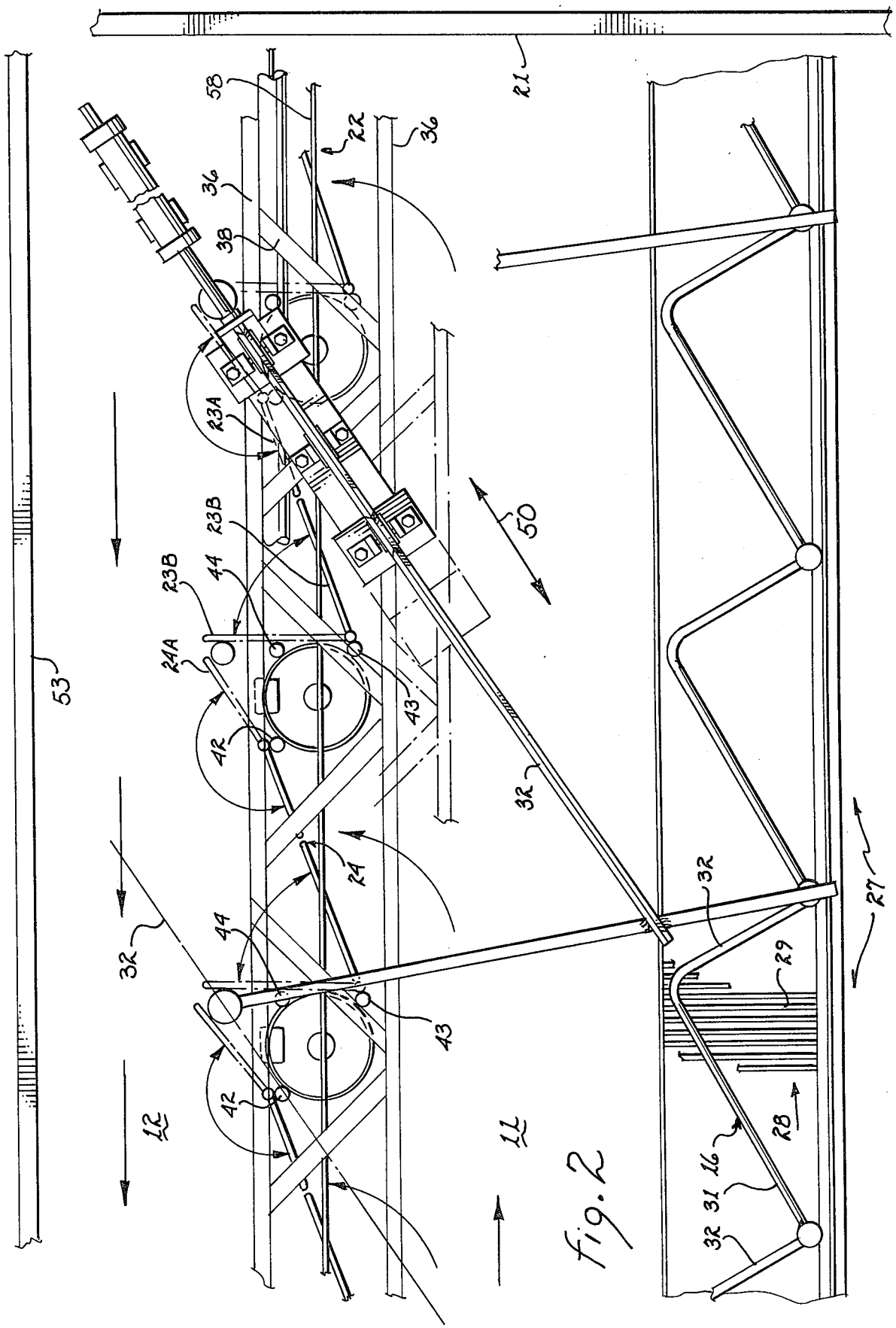

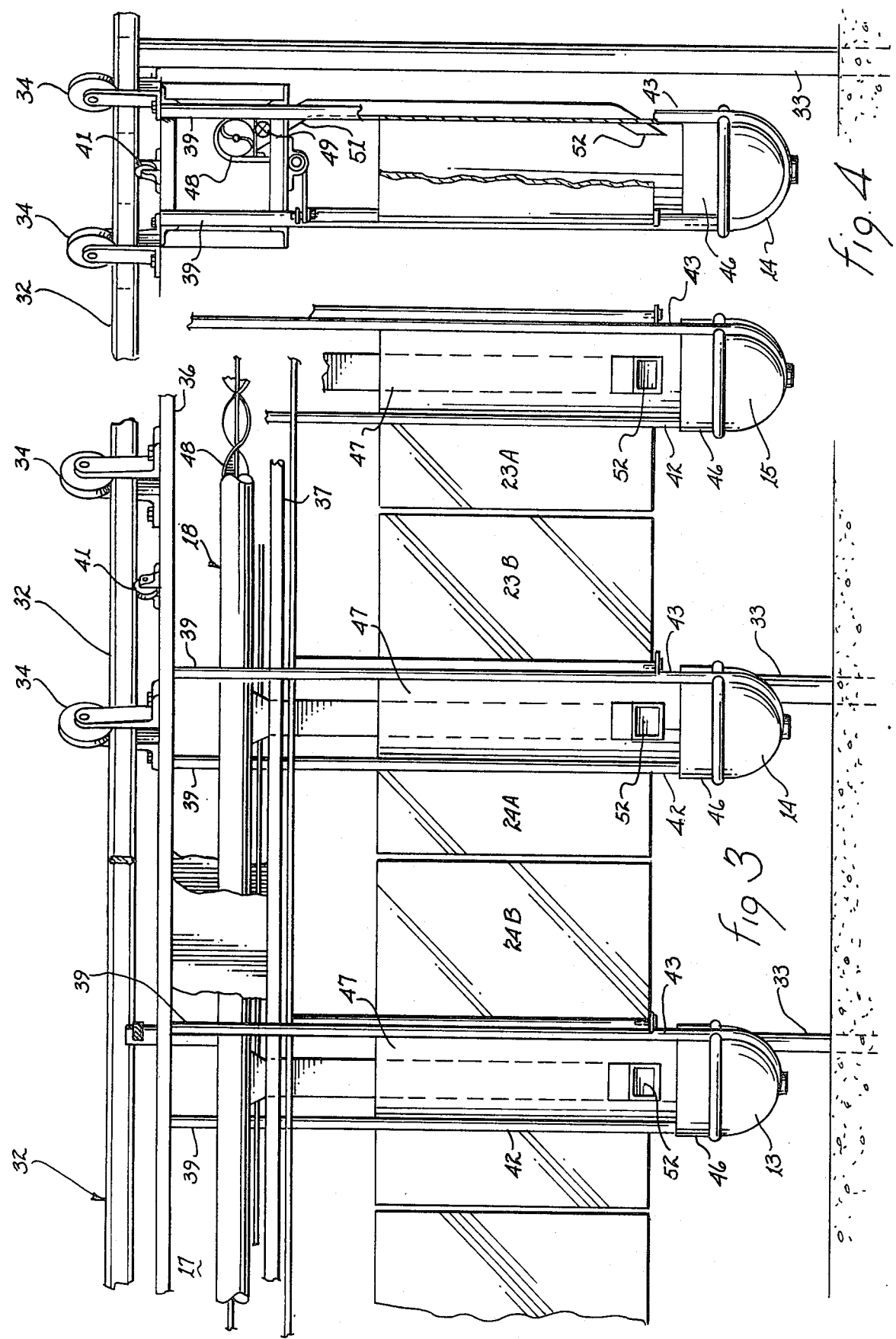

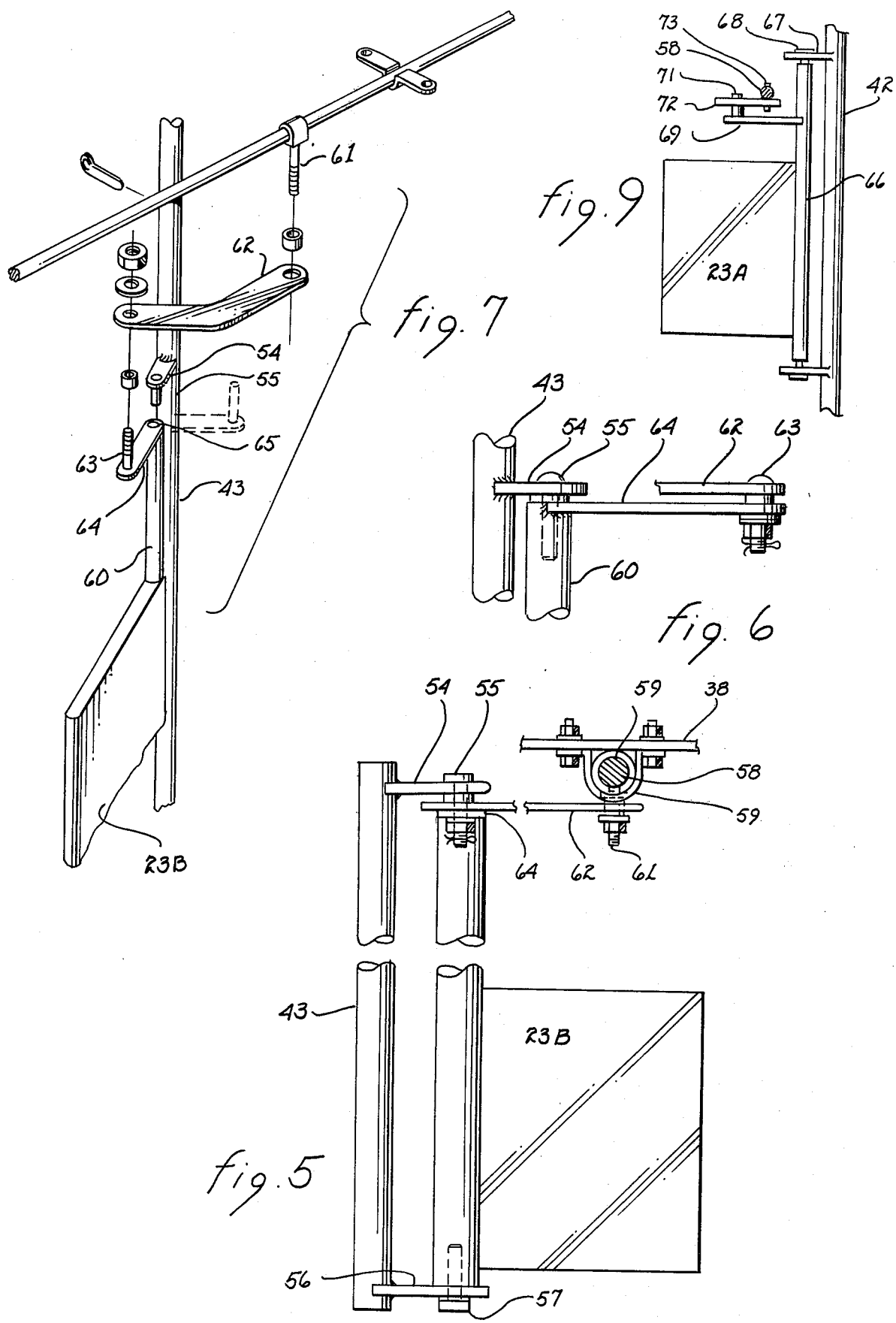

MILKING BARN SYSTEM AND APPARATUS

BACKGROUND OF THE INVENTION

This application relates to an improved milking barn system and apparatus and it is an object of the invention to provide an improved system and apparatus of this nature.

Over a period of years the direction of improving milking barn systems and apparatus has been continually toward increased efficiency and usefulness. In general, this trend has paralleled the trend of increasing costs of producing milk as well as of any other articles or products of commerce.

In the very early days, each cow was milked by hand, the cows being disposed parallel to each other and at right angles to a feeding stall. In this era, the milking attendant had to seat himself between the cows and proceed with the milking operation. Subsequently, there came the milking machine wherein teat cups were attached to the teats of the cow's udder and the milking proceeded in this fashion. In this operation, one attendant could milk several cows at the same time, so long as there was a milking machine attachment for each cow.

Subsequently still, cows were herded, usually single file, into a milking barn and the cows were disposed at an angle of perhaps 30 degrees to the direction of the feed stations with the cows, however, being close enough to each other so that each would touch its neighbor for satisfying the herd instinct. These systems or apparatus have been referred to as echelon systems for herringbone systems of which the herringbone terminology will be used throughout this application. A system and apparatus of this nature is disclosed in the U.S. Pat. No. 2,969,039 to Golay. Subsequently further still, as for example, in the U.S. Pat. No. 3,738,320 to Holm the cows were herded into milking stalls of the herringbone variety, the cows moving in single file. However, the position of the feed bowl was adjustable so that the cow could be positioned toward the rear of the milking stall as far as desired. This enabled the stalls to be adjusted for cows of different lengths. In structures such as shown in the Holm patent, the cows still moved into the milking barn in single file and moved outwardly thereof in the same manner.

In the Jacobs et al U.S. Pat. No. 3,810,442, cows are moved into and away from the milking areas by means of moving platforms or the like. But, each stall has a swinging gate on it and the cows move out of the milking stalls in parallel which is to say simultaneously and thus are moved out of the milking area at a faster rate. The swinging gates, however, are wide and take up an excessive amount of space and move into the egress area thereby still making it difficult to move the cows out of the milking area expeditiously. In the Vandenberg U.S. Pat. No. 3,885,528 a herringbone milking apparatus is illustrated wherein a plurality of swinging gates is available for the cows to exit through, but only one gate is provided for every two cows. In this arrangement while cows are exiting more rapidly than other earlier arrangements, there is still the delay occasioned by one cow having to follow another one in egressing from the milking stalls. In addition the gates take up substantial room and thereby tend to clog the egress area. In the Nielsen et al U.S. Pat. No. 4,194,467 a herringbone milking structure is illustrated wherein the cows enter in single file and also exit single file. In the Nielsen patent a framework or stanchion is adjusted to the shoulders of each cow. The stanchion structure is unitary so that it is adjusted at the same time for all cows and thus all cows are moved backwardly at the same time. In this manner, as indicated above, the stanchion is adjusted in order to accommodate cows of different lengths. Increased efficiencies are achieved by milking cows of the same general length at the same time; that is to say, short cows one time and longer cows at another.

In all of these prior arrangements, inefficiencies still remain because of the time necessary to exit the cows from the milking stalls into the egress area. And also because the adjustability of the feeding arrangements and the positioning of the cows in the milking stalls is not as efficient as it might be. Accordingly, it is a further object of the invention to provide improved herringbone milking barn system and apparatus which will overcome the defects of the prior art.

SUMMARY OF THE INVENTION

It is a further object of the invention to provide an improved milking barn system and apparatus that is simple in conception, effective in operation and efficient to use.

In carrying out the invention according to one form there is provided in a herringbone stall at least a pair of adjacent cow stations comprising, a zig-zag stationary back assembly for receiving the rear and side portions of at least two adjacent cows, a reciprocatable framework mounted adjacent the head portions of adjacent cows, adjacent feed bowl frameworks being suspended from such framework, each of the feed bowl frameworks cooperating with a respective one of the adjacent rear portions to form an individual cow stall, the space between the bowl frameworks and the rear and side portions defining an ingress aisle for cows, first and second gate sections mounted on each of the feed bowl frameworks, the first gate sections being pivotally mounted for clockwise rotation on one side of the feed bowl frameworks and the second gate sections being pivotally mounted for counterclockwise rotation on the opposite side of the frameworks, the first gate section mounted on one feed bowl framework and the second gate section mounted on the adjacent feed bowl framework forming the gate for one cow, an egress aisle on the side of the feed bowl frameworks opposite the ingress aisle, and means on the framework for actuating all of the first and second gate sections simultaneously.

In carrying out the invention according to a further form the lengths of the first and second gate sections are unequal in length for maximizing the width of the egress aisle, means are provided for reciprocating the reciprocatable framework in the direction defined by the lengths of the individual cows stalls, the direction of the reciprocation has an angularity relative to the line of the cows stalls, such angularity being typically about thirty degrees and the line defined by the first and second gates sections has an angularity relative to the line of the cow stations less than the angle of the direction of reciprocation.

It is a further object of the invention to provide an improved milking barn system and apparatus of the character indicated that provides for easiest egress of the cows from the milking stations and maximum available space for the cows to move out of the barn once the milking operation had been completed.

Further objects and advantages of the invention will appear as the description proceeds.

BRIEF DESCRIPTION OF THE DRAWINGS

FIG. 2 is a plan view somewhat fragmentary of the structure shown in FIG. 1;

FIG. 3 is a front elevational view of the apparatus shown in the preceding figures;

FIG. 4 is an end, or side, elevational view partially in section of the apparatus shown in the proceeding figures;

FIG. 5 is a fragmentary front view of an enlarged scale showing certain operating components in closed position;

FIG. 6 is a fragmentary side view of the components;

FIG. 7 is an exploded perspective view of the components shown in FIG. 5;

FIG. 9 is a fragmentary view of another operating component.

DESCRIPTION OF THE PREFERRED EMBODIMENTS

Figure 1:
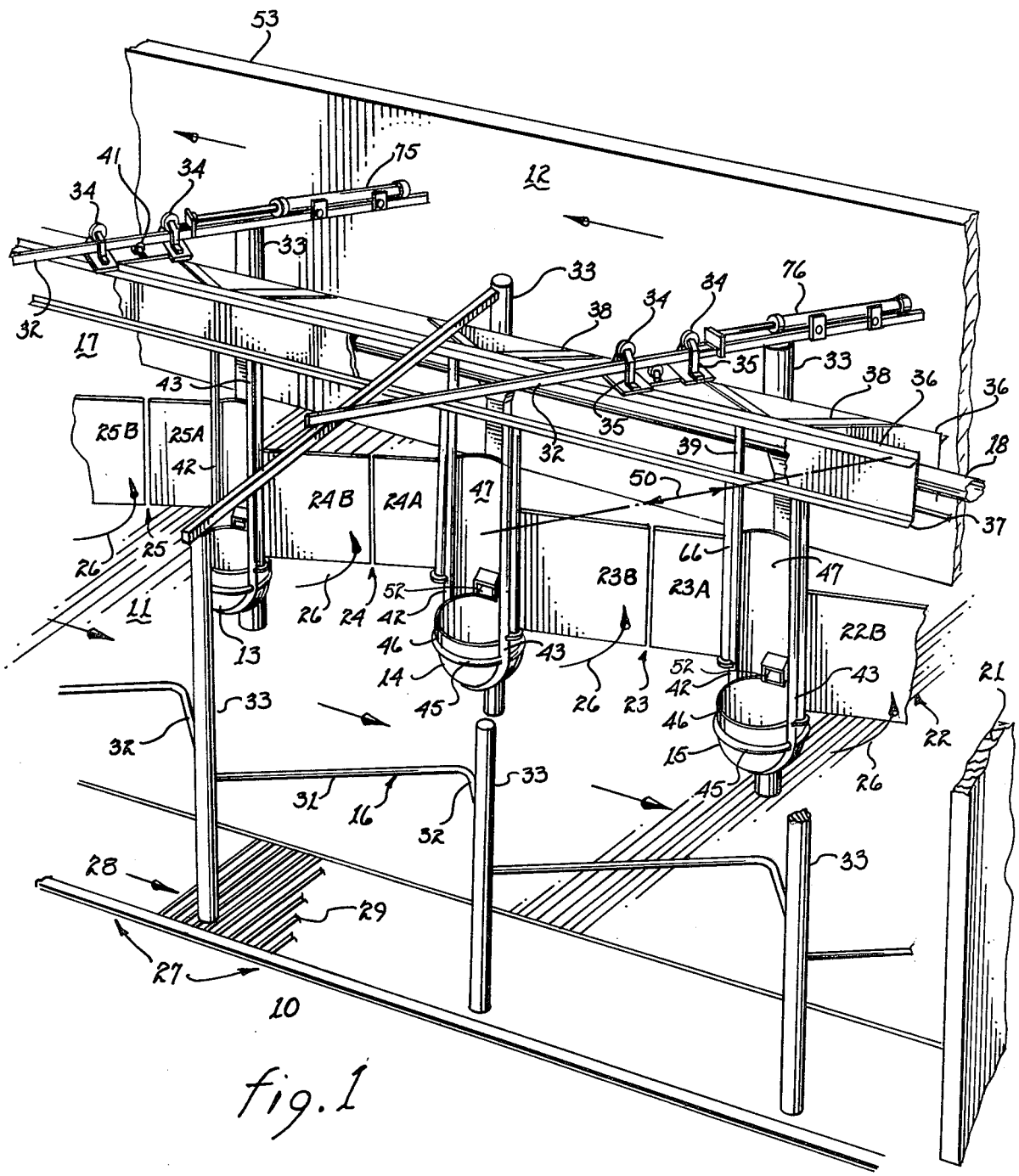
FIG. 1 is a perspective view of structure incorporating the invention.
Figure 8:
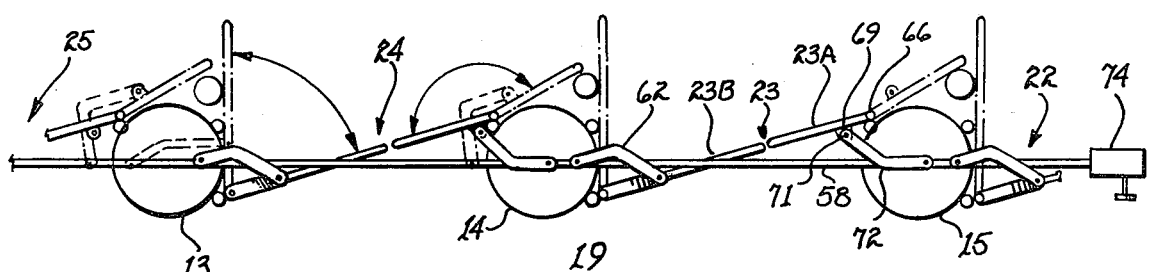
FIG. 8 is a fragmentary view of the gate operating components.

Referring to the drawings there is shown a milking barn system and apparatus according to the invention, comprising a structure 10 including an ingress area 11, an egress area 12, a series of feed bowls 13, 14, 15, et., a herringbone or zig-zag, back rail 16, a reciprocatable supporting framework 17, feed mechanism 18 and control mechanism 19 (FIG. 8). The ingress area 11 is wide enough for cows to move in easily, and each cow finds a feed bowl such as, for example, 13, 14, or 15 and the like and a solid panel 21 is provided at one end so that the cows cannot egress in this direction. The cows egress through gates 22, 23, 24, or 25, etc. simultaneously into the egress area 11 after the milking and feeding is complete. The egress area 12 is of sufficient width for the cows to move readily therethrough and as shown by the arrows 26, the cows move simultaneously from their respective feeding and milking areas into the egress area 12. That is to say, the cows move from the feeding area in parallel, and thus do not cause any delay such as would be occasioned, if one cow had to walk behind the other. Once the cows get into the egress area 12, they can move out in single file without any further delay. Thereafter, the feeding bowls 13, 14, 15, etc. are immediately available, the gates 22, 23, 24, 25 can be closed, and a second group of cows brought in for feeding and milking purposes. Time efficiency is achieved.

The ingress and egress areas 11 and 12, respectively, as well as the pit area 27 include a solid floor which may be of concrete, for example, with a gutter area 28 which may have a grill 29 thereon for the customary purposes. The back rail 16 is disposed over the gutter area and includes an enlongated rail portion 31 and a shortened rail portion 32. The space defined by the rail portions 31 and 32 is utilized by the milking attendant to provide access to the cow's udders for attaching of the teat cups of the milking machine. Obviously, the rail portion 32 comes opposite the hind legs of the cow and thus prevents any further rearward movement.

The reciprocatable supporting framework 17 is suspended from rails 32 which may be supported on vertical columns 33 cemented into the floor. There need be a rail 32 only for every two feed bowl structures and correspondingly only columns 33 for every two feed bowls. The framework 17 is supported on the rails 32 by means of grooved rollers 34 which run on the rails, the roller being attached by means of hangers 35 to the upper longitudinal frame members 36 of the framework proper.

In addition to the upper longitudinal frame members 36, the framework 17 includes lower longitudinal frame members 37, transverse bracing members 38 and vertical bracing members 39. By virtue of the frame members 36 and 37 together with the transverse bracing members 38 and the vertical bracing members 39, the frame structure 37 is unitary and moves as a unit on the rails 32 suspended from the rollers 34. The various frame members may be welded to each other to form the unit 37.

Between two rollers 34 running on the same rail 32 there is a leverage control wheel 41 which rides on the underside of the rail 32 and is supported on the cross bracing members 38 of the framework 17. It will be evident, by virtue of the fact that the leverage control wheel 41 is between the rollers 34 that the framework 17 is prevented from rocking in its movements to and fro.

Extending downwardly from the vertical bracing members 39, which for convenience may be tubes or pipes, are suspension members 42 and 43 curved at the bottom and may be joined at the apex as shown. The members 42 and 43 may be extensions of member 39 welded to the frame members. Another vertically downwardly extending member 44 has its upper end welded, for example, to one of the cross-bracing members 38 and its lower end is curved as are the lower ends of the other vertical members and is joined to their point of juncture. Adjacent the curved lower portions of the vertical members 41, 42 and 43 is a circular ring 45, welded for example, to form a support for the feed bowl 46 which may be removed when desired and is utilized to contain the food provided for each cow. The vertical members 42, 43, 44, the ring 45 and the attachment of these vertical members to each other at the lower end and to the framework 17 at the upper end form a stanchion, one for each cow.

The stanchion, of course, is intended to receive the head of the cow while the cow is feeding and while the milking process is going on. When the framework 17 moves backward and forward in the direction of double ended arrow 50 (some lines shown dotted in FIG. 2), that is to say reciprocates on its supporting rollers, the stanchions move back and forth and thus adjust the space within which the cow is intended to stand. For shorter cows, the stanchions are moved rearwardly and for larger or longer cows the stanchions are moved forwardly. The principal effect causing the cow to move rearwardly or forwardly is the proximity of the feed bowl 46 to the cow's nose, or mouth. A circular splashguard 47 which is open at the cow's face, may be attached to the vertical members 42, 43, 44 by welding, for example. The lower edge of the splashguard is adjacent the upper edge of the feed bowl 46 and extends upwardly as far as desired. Conveniently, the upper and lower edges of the splashguard 47 will coincide with the upper and lower edges of the gate members to be described.

Held within the framework 17 is a feed augur arrangement 48 which is well known and from which there depends downwardly a measured feed distributing wheel arrangement and housing. From the measured feed distributing wheel 49 housing a feed chute extends 51 downwardly, terminating through an opening 52 in the lower portion of the splash guard 47. Thus, the food distributed by the feed augur 48 through the measured feed distributing wheel arrangement 49 falls through the chute 51 and opening 52 into the bowl 46 for each cow.

Since the feed mechanism 18 including the augur 48 and the distributing wheel 49 are mounted on the framework 17 these components reciprocate with the frame 17 and thus the feeding arrangement moves back and forth at the same time that the stanchions are being adjusted for individual cows. The food supply apparatus accordingly is always available at the place where it is needed.

Economy of movement with respect to feeding of the cows, and adjusting of the stall arrangement to the different lengths of groups of cows is part and parcel of the aspect of rapidly moving the cows out of the feeding and milking area stanchions after the feeding and milking processes are complete. Thus between each of two adjacent cow stations as represented by the feed bowls 13 and 14 there is a gate 24, and between the stations represented by the feed bowls 14 and 15 there is a gate 23, etc. In FIG. 2, two additional gates 25 and 22 are shown. As has already been pointed out gates 22, 23, 24 and 25 and others in any particular system open simultaneously when the milking and feeding process has been completed in order to provide for simultaneous and expeditious egress of the cows from the milking stations in the egress area 12. In order to facilitate this process still further and better, each of the gates 22, 23, 24 and 25 is composed of two gate sections to which are assigned the reference characters 22A, 22B, 23A, 23B, 24A, 24B, 25A, and 25B.

In the following description of the gate sections, gate sections 23A and 23B will be particularly described as to the mounting arrangement and operation, but it will be understood that other gates will be mounted and operated in duplicate fashion. The gate section 23A is shorter than the gate section 23B so that when the gates are swung open, that is to say from the position shown in solid lines in FIG. 2 to the position shown in phantom lines, the space between the gates and the barrier 53, which defines the limit of the egress area is essentially at a maximum. Hence, the cows have the most room that there can be to walk out. It will be observed and understood that if the gate section 23A were of the same length as the gate section 23B and the opening movement occurred, the extremity of the gate 23A would project further into the space defined by the barrier 53 than the space between the end of the gate section 23B and the barrier 53. The outward extent of the gate 23A defines the space available for the cow in the coming through the gate 22 to move. Similarly, the end of the gate 24B defines the space through which the cow coming through gate 23 will have to move. It is an aspect of the invention to maximize this space in order to facilitate the movement of the cows through the egress area.

The gate section 23A is pivoted to supports attached to the vertical member 42 associated with the left hand side of the bowl 15. The gate section 23B is pivoted to supports attached to the vertical member 43 associated with the right hand side of the bowl 14. The pivoting of the gate sections associated with the vertical members may be understood more clearly by referring to FIG. 5 in which a gate section 23B is shown. The gates, for example, 23B, need not extend farther up than about as shown. An arm 60 attached to and forming part of the gate along one side extends upwardly from the gate to the area of the actuating mechanism. At the upper end of the arm 60 there is a link 54 which is welded to the vertical member 44. The projecting end of the link 54 includes a pin 55 which is received in an appropriate opening in an upper end of arm 60 to form a pivot in the upper end of gate section 23B. Correspondingly at the lower end of the gate section 23B there is a length 56 welded to the vertical member 44 with the projecting end of the link having a pin 57 projecting into the lower end of the arm 60. Thus the gate 23B will swing about the pivots provided by the pins 55 and 57. The vertical extent of the gate sections as shown in FIGS. 5 and 3 corresponds to the height of the splash guard previously described. The gates are tall enough to obscure the cows vision to the outside during the milking and feeding process. The gate section 23B includes an arm 60A along one side which is hinged to links attached to the vertical member 42 in the same manner as described for the gate section 23B.

Referring to FIGS. 5, 6, 7 and for the closed gate position, there is shown a bracing member 38 to which an actuating rod 58 is attached by means of a stirrup like member 59 bolted to the bracing member 38, a nylon or other similar material bushing 59 being provided to lessen the friction of moving the control rod 58. The control rod 58 includes a pin 61 attached thereto and depending therefrom. The pin 61 extends through an appropriate hole in a bent linkage bar 62, the other end of which is pivoted by pin 63 to an arm 64 welded as at 65 to the gate section 23B.

Similarly with respect to gate section 23B (illustrated in FIGS. 9 as well as 2 and 8) the gate section 23A includes an attaching arm 66 along one side thereof. Gate 23A through arm 66 is attached to vertical member 42 by means of a link bar 67 welded to member 42 and a pin 68. Also attached to the gate section 23A through arm 66 is an L shaped link bar 69 the end of which is linked by a pin 71 to a bent linkage bar 72. The other end of bent link 72 is linked to the control bar 58 by means of a pin 73.

In FIG. 8 the gate sections 23A and 23B are shown in solid lines in the closed position of the gate. When the control rod 58 is moved toward the left, it will be evident that the bent linkage bar 62 will cause the gate section 23B to swing into the dotted line position. The corresponding movement of the bent linkage bar 72 will cause the gate section 23A to move in to the dotted line or open position. Similarly, movement of the control rod 58 toward the right will cause the gate sections 23A and 23B to move from their dotted lines positions, respectively, to the solid line positions, which is to say to the closed position.

It will be understood that the control rod is linked to the gate sections at gates 22, 24 and 25 and any others in the same manner as described in connection with gate 23 and illustrated specifically in FIGS. 5-9. Thus a single movement in one direction of the control rod 58 opens all of the gates and movement in the reverse direction closes all of the gates. When all of the gates are open they are open the full amount so that the cows can all exit from the milking and feeding stations into the egress area at one time thereby increasing the efficiency of this phase of the operation.

The angularity of the gates (gate 23) with respect to the direction of the control rod 58 may be in the vicinity of 30 degrees, although this may be varied as desired.

This angularity and taking into account the angularity of the direction of movement of the stalls with respect to the direction of the line of feed bowls or the control rod 58 also may be about 30 degrees in a typical case, the angle is such that the gate sections 23A and 23B open to their fullest for the quick egress of the cows from their milking stations. The location of the link pins and the shape of the linkage arms may be chosen to give the maximum opening desired. The location of the vertical members 43 and 42 may be selected as desired. As may be observed in FIG. 6 the angle of gate sections 23A and 23B as between their closed and open position is about 180 degrees and 60 degrees, respectively. The movement of the control rod 58 may be achieved by any well known pneumatic, electrical or hydraulic means indicated by the box 74.

Mounted on the superstructure which includes the rails 32 are a pair of pneumatic cylinders 75 and 76 whose pistons are connected by rods to carriages carrying the rollers 34. Air pressure to the cylinders 75 and 76 is supplied and controlled in any well-known manner for moving the framework 17 either forward or backward to accommodate particular sizes of cows. While one form of the invention has been described, it will be understood that other forms may be devised within the scope of the disclosure.

What is desired to be claimed is:

1. In a herringbone stall at least one pair of adjacent cow stations comprising a zig-zag stationary tail assembly for receiving the rear and rear side portions of at least two adjacent cows, a reciprocatable framework mounted adjacent the head portions of adjacent cows, adjacent feed bowl frameworks being suspended from said reciprocatable framework, each of said feed bowl frameworks cooperating with a respective one of said adjacent rear portions to form an individual cow stall, the space between said feed bowl frameworks and said rear and side portions defining an ingress aisle for cows, first and second gate sections mounted on each of said feed bowl frameworks, said first gate sections being pivotally mounted for clockwise rotation outwardly on one side of said feed bowl frameworks and said second gate sections being pivotally mounted for counterclockwise rotation outwardly on the opposite side of said feed bowl frameworks, the first gate section mounted on one feed bowl framework and the second gate section mounted on the adjacent feed bowl framework forming the gate for one cow, the line of said first and second gate sections for each stall has an acute angularity relative to the line of said cow stations, an egress aisle on the side of said feed bowl frameworks opposite to said ingress aisle, and means on said framework for actuating all of said first and second gate sections simultaneously.

2. The herringbone stall according to claim 1 including means for reciprocating said reciprocatable framework in the direction defined by the lengths of said individual cow stalls.

3. A herringbone stall according to claim 1 wherein the lengths of said first and said second gate sections are unequal for maximizing the width of said egress aisle.

4. In a herringbone stall at least one pair of adjacent cow stations comprising a zig-zag stationary tail assembly for receiving the rear and rear side portions of at least two adjacent cows, a reciprocatable framework mounted adjacent the head portions of adjacent cows, adjacent feed bowl frameworks being suspended from said reciprocatable framework, each of said feed bowl frameworks cooperating with a respective one of said adjacent rear portions to form an individual cow stall, the space between said feed bowl frameworks and said rear and side portions defining an ingress aisle for cows, first and second gate sections mounted on each of said feed bowl frameworks, said first gate sections being pivotally mounted for clockwise rotation outwardly on one side of said feed bowl frameworks and said second gate sections being pivotally mounted for counterclockwise rotation outwardly on the opposite side of said feed bowl frameworks, the first gate section mounted on one feed bowl framework and the second gate section mounted on the adjacent feed bowl framework forming the gate for one cow, an egress aisle on the side of said feed bowl frameworks opposite to said ingress aisle, means on said framework for actuating all of said first and second gate sections simultaneously, the lenghts of said first and said second gate sections are unequal for maximizing the width of said egress aisle, said lesser length gate section is adjacent the particular feed bowl and pivots clockwise, and the greater length gate section is adjacent the feed bowl next to the particular feed bowl and pivots counterclockwise.

5. The herringbone stall according to claim 4 wherein a feed chute is carried by each of said feed bowl frameworks.

6. The herringbone stall according to claim 4 wherein said framework carries an auger for supplying feed to said feed chutes.

7. The herringbone stall according to claim 6 wherein each of said feed bowl frameworks carries a feed bowl served by the immediate feed chute.

8. In a herringbone stall at least one pair of adjacent cow stations comprising a zig-zag stationary tail assembly for receiving the rear and rear side portions of at least two adjacent cows, a reciprocatable framework mounted adjacent the head portions of adjacent cows, adjacent feed bowl frameworks being suspended from said reciprocatable framework, each of said feed bowl frameworks cooperating with a respective one of said adjacent rear portions to form an individual cow stall, the space between said feed bowl frameworks and said rear and side portions defining an ingress aisle for cows, first and second gate sections mounted on each of said feed bowl frameworks, said first gate sections being pivotally mounted for clockwise rotation outwardly on one side of said feed bowl frameworks and said second gate sections being pivotally mounted for counterclockwise rotation outwardly on the opposite side of said frameworks, the first gate section mounted on one feed bowl framework and the second gate section mounted on the adjacent feed bowl framework forming the gate for one cow, an egress aisle on the side of said feed bowl frameworks opposite to said ingress aisle, means on said reciprocatable framework for actuating all of said first and said second gate sections simultaneously, the lengths of said first and said second gate sections are unequal for maximizing the width of said egress aisle, and means for reciprocating said reciprocatable framework in the direction defined by the lengths of said individual cow stalls, said means for actuating said gate sections simultaneously including an actuating bar running the length of said framework and operating links connecting said actuating bar and said gate sections.

9. The herringbone stall according to claim 8 wherein the means for reciprocating the reciprocatable framework comprises pneumatic cylinders.

10. The herringbone stall according to claim 9 including floor supported rail members, carrier wheels adapted to roll on said rail members, and suspension members attaching said reciprocatable framework to said carrier wheels.

11. In a herringbone stall at least one pair of adjacent cow stations comprising a zig-zag stationary back assembly for receiving the rear and rear side portions of at least two adjacent cows, a reciprocatable framework mounted adjacent the head portions of adjacent cows, adjacent feed bowl frameworks being suspended from said reciprocatable framework, each of said feed bowl frameworks cooperating with a respective one of said adjacent rear portions to form an individual cow stall, the space between said feed bowl frameworks and said rear and side portions defining an ingress aisle for cows, first and second gate sections mounted on each of said feed bowl frameworks, said first gate sections being pivotally mounted for clockwise rotation outwardly on one side of said feed bowl frameworks and said second gate sections being pivotally mounted for counterclockwise rotation outwardly on the opposite side of said feed bowl frameworks, the first gate section mounted on one feed bowl framework and the second gate section mounted on the adjacent feed bowl framework forming the gate for one cow, an egress aisle on the side of said feed bowl frameworks opposite to said ingress aisle, means on said framework for actuating all of said first and second gate sections simultaneously, the lengths of said first and said second gate sections are unequal for maximizing the width of said egress aisle, said lesser length gate section is adjacent the particular feed bowl and pivots clockwise, the greater length gate section is adjacent the feed bowl next to the particular feed bowl and pivots counterclockwise, and means for reciprocating said reciprocatable framework in the direction defined by the lengths of said individual cow stalls.

12. The herringbone stall according to claim 11 wherein said direction of reciprocation has an angularity relative to the line of said cow stations.

13. The herringbone stall according to claim 12 wherein said angularity is about thirty degrees.

14. The herringbone stall according to claim 13 wherein the line of said first and second gate sections has an angularity relative to the line of said cow stations less than the angle of said direction of reciprocation.

15. The herringbone stall according to claim 14 wherein the opening angle of said first and second gate sections is greater than ninety degrees.

* * * * *